US012565569B2

(12) United States Patent
Palin et al.

(10) Patent No.: US 12,565,569 B2
(45) Date of Patent: Mar. 3, 2026

(54) METHOD FOR TREATING POLYIMIDE

(71) Applicant: GOODWIN PLC, Staffordshire (GB)

(72) Inventors: Michael Gerard Palin, Staffordshire (GB); Matthew Stanley Goodwin, Staffordshire (GB); Philip Longfield, Staffordshire (GB)

(73) Assignee: GOODWIN PLC, Staffordshire (GB)

( * ) Notice: Subject to any disclaimer, the term of this patent is extended or adjusted under 35 U.S.C. 154(b) by 28 days.

(21) Appl. No.: 18/714,041

(22) PCT Filed: Nov. 29, 2022

(86) PCT No.: PCT/GB2022/053013
§ 371 (c)(1),
(2) Date: May 29, 2024

(87) PCT Pub. No.: WO2023/094840
PCT Pub. Date: Jun. 1, 2023

(65) Prior Publication Data
US 2025/0019509 A1    Jan. 16, 2025

(30) Foreign Application Priority Data
Nov. 29, 2021    (GB) ...................................... 2117218

(51) Int. Cl.
| | |
|---|---|
| *C08J 7/12* | (2006.01) |
| *C08G 73/10* | (2006.01) |
| *C08K 3/04* | (2006.01) |
| *C08K 9/10* | (2006.01) |
| *B29C 43/10* | (2006.01) |

(52) U.S. Cl.
CPC ........... *C08J 7/12* (2013.01); *C08G 73/1028* (2013.01); *C08G 73/105* (2013.01); *C08G 73/1071* (2013.01); *C08K 3/04* (2013.01); *C08K 9/10* (2013.01); *B29C 43/10* (2013.01); *C08J 2379/08* (2013.01)

(58) Field of Classification Search
CPC ........................................................ C08J 7/12
See application file for complete search history.

(56) References Cited

U.S. PATENT DOCUMENTS

| | | | |
|---|---|---|---|
| 3,179,631 A | 4/1965 | Laszlo | |
| 3,249,588 A | 5/1966 | George | |
| 3,413,394 A | 11/1968 | Jordan | |
| 3,511,807 A | 5/1970 | Lovejoy | |
| 4,238,538 A | 12/1980 | Manwiller | |
| 4,755,555 A | 7/1988 | Manwiller et al. | |
| 9,133,337 B2 * | 9/2015 | Ludvik ..................... | F26B 3/00 |
| 2002/0019112 A1 | 2/2002 | Farrar | |
| 2002/0094651 A1 | 7/2002 | Farrar | |
| 2004/0145014 A1 | 7/2004 | Farrar | |
| 2016/0122474 A1 | 5/2016 | Nozaki | |

FOREIGN PATENT DOCUMENTS

| | | |
|---|---|---|
| CN | 111764156 A | 10/2020 |
| EP | 2520607 A2 | 11/2012 |

OTHER PUBLICATIONS

European Office action for corresponding EP 22821580, mailed Aug. 8, 2024. (Year: 2024).*
Particle size analysis—Laser diffraction methods. retrieved from: ISO 13320:2009—60 pages.
Determination of the specific surface area of solids by gas adsorption—BET method. ISO 9277:2010 retrieved from: ISO 9277:2010—34 pages.
ASTM D1708 retrieved from: D1708 Standard Test Method for Tensile Properties of Plastics by Use of Microtensile Specimens (astm.org); 5 pages.
ASTM D792-20 retrieved from: D792 Standard Test Methods for Density and Specific Gravity (Relative Density) of Plastics by Displacement (astm.org); 6 pages.
Chent et al. "Measuring surface tension of liquids at high temperature and elevated pressure." Journal of Chemical & Engineering Data 53.3 (2008): 742-744.
Brock et al., "Surface tension and the principle of corresponding states." AIChE Journal 1.2 (1955): 174-177.
Hakim et al., "Generalized relationship for the surface tension of polar fluids." Industrial & Engineering Chemistry Fundamentals 10.1 (1971): 174-175.
Miqueu "An extended scaled equation for the temperature dependence of the surface tension of pure compounds inferred from an analysis of experimental data." Fluid phase equilibria 172.2 (2000): 169-182.
Zuo et al., "Corresponding-states and parachor models for the calculation of interfacial tensions." The Canadian Journal of Chemical Engineering 75.6 (1997): 1130-1137.
Wypych "Handbook of Polymers" 2nd Ed, 2016, ChemTec Publishing. 12 pages.
Shinkon "Structure and morphology control in polymer aerogels with low crosslink density." The University of Akron, 2015. 238 pages.
Vespel, Summary of Typical Properties, Vespel Polyimide Parts 8 pages. (1989).

* cited by examiner

*Primary Examiner* — Atul P. Khare
(74) *Attorney, Agent, or Firm* — QUARLES & BRADY LLP

(57) ABSTRACT

Disclosed is a method of treating a polyimide, comprising: providing a polyimide to be treated; and contacting the polyimide to be treated with a fluid to obtain a treated polyimide; wherein the polyimide comprises a first repeat unit derived from pyromellitic dianhydride (PMDA) and a second repeat unit derived from 4,4'-oxodianiline (4,4'-ODA); and wherein the fluid comprises a supercritical fluid, a liquid with a surface tension of 10.0 mN m"1 or less under the conditions of the contacting step, or a mixture thereof. Also disclosed are polyimides obtainable by the methods of the invention, formed polyimide products comprising the polyimides of the invention, and articles comprising the formed polyimide products of the invention.

19 Claims, No Drawings

METHOD FOR TREATING POLYIMIDE

CROSS-REFERENCE TO RELATED APPLICATIONS

This application represents the national stage entry of PCT International Application No. PCT/GB2022/053013 filed on Nov. 29, 2022, which claims the benefit of United Kingdom Patent Application No. 2117218.4 filed on Nov. 29, 2021, the entire contents of which are incorporated herein by reference for all purposes.

FIELD OF THE INVENTION

The present invention relates to methods for treating polyimides, polyimides obtainable by the methods of the invention, formed polyimide products comprising the polyimides of the invention, and articles comprising the formed polyimide products of the invention.

BACKGROUND TO THE INVENTION

Polyimides are well known as durable high performance polymers with applications in fields such as aerospace, automotive, and oil and gas industries. Typical characteristics of polyimide materials include heat resistance, lubricity, dimensional stability, chemical resistance and creep resistance. Such known polyimides are described in U.S. Pat. Nos. 3,249,588, 3,179,631, and 4,755,555, for example, and have been commercially available for many years, such as the Vespel® SP product range from DuPont and Meldin® 7000 product range from Saint-Gobain performance plastics, that conform to ASTM standard D6456-10 (Standard Specification for Finished Parts Made from Polyimide Resin).

The continuing engineering challenges faced in fields such as aerospace, automotive and heavy industries mean it is desirable to provide polyimide materials having improved mechanical properties, especially at higher temperatures. From environmental and economic perspectives it is also desirable to provide processes which enable a reduction in volatile organic compound (VOC) use, and also which enable recovery and re-use of the majority of agents used in the processing of polyimide materials.

SUMMARY OF THE INVENTION

The present invention aims to provide a solution to the problems discussed above. In particular, the present invention provides a method of treating a polyimide, comprising: providing a polyimide to be treated; and contacting the polyimide to be treated with a fluid to obtain a treated polyimide; wherein the polyimide comprises a first repeat unit derived from pyromellitic dianhydride (PMDA) and a second repeat unit derived from 4,4'-oxodianiline (4,4'-ODA); and wherein the fluid comprises a supercritical fluid, a liquid with a surface tension of 10.0 mN m$^{-1}$ or less under the conditions of the contacting step, or a mixture thereof, and wherein the method optionally further comprises a step of mixing the treated polyimide with an additive to obtain a polyimide mixture.

The present invention also provides a method of forming a treated polyimide of the invention or the polyimide mixture of the invention to obtain a formed polyimide product.

The present invention also provides a treated polyimide, a polyimide mixture, and a formed polyimide product obtainable by the methods of the present invention.

The present invention also provides a polyimide having a BET specific surface area greater than 100 m$^2$ g$^{-1}$, wherein the polyimide comprises a first repeat unit derived from pyromellitic dianhydride (PMDA) and a second repeat unit derived from 4,4'-oxodianiline (4,4'-ODA), and wherein the polyimide does not comprise a encapsulated filler or comprises an encapsulated filler in an amount of 20 wt % or less relative to the weight of the polyimide.

The present invention also provides a polyimide having a BET specific surface area greater than 70 m$^2$ g$^{-1}$, wherein the polyimide comprises a first repeat unit derived from pyromellitic dianhydride (PMDA) and a second repeat unit derived from 4,4'-oxodianiline (4,4'-ODA), and wherein the treated polyimide comprises an encapsulated filler in an amount of 20 wt % to 60 wt % relative to the weight of the polyimide.

The present invention also provides a direct formed crystalline polyimide product wherein the polyimide comprises a first repeat unit derived from pyromellitic dianhydride (PMDA) and a second repeat unit derived from 4,4'-oxodianiline (4,4'-ODA), and wherein the direct formed crystalline polyimide product:

does not comprise an encapsulated filler, comprises 0 wt % to 0.5 wt % of an additive relative to the weight of the polyimide, and has a tensile strength of 80.0 MPa or greater; or comprises 10 wt % to 20 wt % of an encapsulated filler relative to the weight of the polyimide, comprises 0 wt % to 0.5 wt % of an additive relative to the weight of the polyimide, and has a tensile strength of 63.0 MPa or greater; or comprises 20 wt % to 60 wt % of an encapsulated filler relative to the weight of the polyimide, comprises 0 wt % to 2.0 wt % of an additive relative to the weight of the polyimide, and has a tensile strength of 50.0 MPa or greater; or comprises 10 wt % to 20 wt % of an encapsulated filler relative to the weight of the polyimide, comprises 5 wt % to 15 wt % of an additive relative to the weight of the polyimide, and has a tensile strength of 52.5 MPa or greater; or comprises 20 wt % to 60 wt % of an encapsulated filler relative to the weight of the polyimide, comprises 10 wt % to 20 wt % of an additive relative to the weight of the polyimide, and has a tensile strength of 39.5 MPa or greater.

The present invention also provides a hot isostatically pressed crystalline polyimide product, ram extruded (that may optionally be subsequently hot isostatically pressed) crystalline polyimide product, or hot compression moulded crystalline polyimide product, wherein the polyimide comprises a first repeat unit derived from pyromellitic dianhydride (PMDA) and a second repeat unit derived from 4,4'-oxodianiline (4,4'-ODA), and wherein the hot isostatically pressed crystalline polyimide product, ram extruded (that may optionally be subsequently hot isostatically pressed) crystalline polyimide product, or hot compression moulded crystalline polyimide product:

does not comprise an encapsulated filler, comprises 0 wt % to 0.5 wt % of an additive relative to the weight of the polyimide, and has a tensile strength of 87.0 MPa or greater; or comprises 10 wt % to 20 wt % of an encapsulated filler relative to the weight of the polyimide, comprises 0 wt % to 0.5 wt % of an additive relative to the weight of the polyimide, and has a tensile strength of 66.0 MPa or greater; or comprises 20 wt % to 60 wt % of an encapsulated filler
relative to the weight of the polyimide, comprises 0 wt
% to 2.0 wt % of an additive relative to the weight of
the polyimide, and has a tensile strength of 52.5 MPa
or greater; or comprises 10 wt % to 20 wt % of an encapsulated filler
relative to the weight of the polyimide, comprises 5 wt
% to 15 wt % of an additive relative to the weight of the
polyimide, and has a tensile strength of 49.5 MPa or
greater; or does not comprise an encapsulated filler, comprises 10 wt
% to 20 wt % of an additive relative to the weight of the
polyimide, and has a tensile strength of 59.0 MPa or
greater; or comprises 20 wt % to 60 wt % of an encapsulated filler
relative to the weight of the polyimide, comprises 10 wt
% to 20 wt % of an additive relative to the weight of the
polyimide, and has a tensile strength of 39.5 MPa or
greater.

The present invention also provides an article comprising
a formed polyimide product of the invention.

The present invention provides several advantages. The
method of the invention enables a reduction in use of volatile
organic compounds, enhanced recovery of residual liquid
media from the polymerisation process (e.g. greater than
90% solvent recovery), re-use of the fluid after the contact-
ing step, and convenient removal of impurities (e.g. acetic
anhydride and phthalic anhydride and their acid derivatives
which may be present as residual end capping agents from
the polymerisation process). The polyimide with increased
SSA of the present invention possesses advantages in that it
can better be compacted when processed into a formed
product under force, resulting in higher achievable densities
for components, improved tensile strength, and improved
high temperature mechanical properties. The formed poly-
imide products of the present invention may have better
elevated temperature mechanical properties than VESPEL
SP grades and Meldin 7000 grades. The present application
provides crystalline formed polyimide products, which may
have superior properties to amorphous products and may for
example have reduced water absorption than amorphous
products.

DETAILED DESCRIPTION OF THE INVENTION

The present invention provides a method of treating a
polyimide, comprising:

providing a polyimide to be treated; and contacting the polyimide to be treated with a fluid to
obtain a treated polyimide;

wherein the polyimide comprises a first repeat unit
derived from pyromellitic dianhydride (PMDA) and a
second repeat unit derived from 4,4'-oxodianiline (4,4'-
ODA);

and wherein the fluid comprises a supercritical fluid, a
liquid with a surface tension of 10.0 mN m$^{-1}$ or less
under the conditions of the contacting step, or a mixture
thereof.

The polyimide to be treated comprises a first repeat unit
derived from PMDA and a second repeat unit derived from
4,4'-ODA. Polyimides comprising a first repeat unit derived
from PMDA and a second repeat unit derived from 4,4'-
ODA are known in the art and are described in U.S. Pat. Nos.
3,249,588 and 3,179,631, for example.

In general, any polyimide to be treated comprising a first
repeat unit derived from PMDA and a second repeat unit derived from 4,4'-ODA is suitable for use as the polyimide
to be treated in the methods of the present invention.

The polyimide to be treated may have a number average
molecular weight of e.g., 10 to 500 kDa, 100 to 600 kDa,
200 to 700 kDa, 300 to 800 kDa, 400 to 900 kDa, or 500 to
1000 kDa.

The polyimide to be treated may have a weight average
molecular weight of e.g., 10 to 500 kDa, 100 to 600 kDa,
200 to 700 kDa, 300 to 800 kDa, 400 to 900 kDa, or 500 to
1000 kDa.

The polyimide to be treated may have a polydispersity
index of e.g. 0.8 to 1.0, 0.9 to 1.1, or 1.0 to 1.2.

The relative molar amounts of the PMDA and 4,4'-ODA
repeat units in the polyimide to be treated are not particularly
limited. Typically the molar ratio of PMDA:4,4'-ODA is in
a range of from 1:1.1 to 1.1:1. Preferably, the molar ratio of
PMDA:4,4'-ODA is in a range of from 1:1.07 to 1.07:1.
More preferably, the molar ratio of PMDA:4,4'-ODA is in a
range of from 1:1.05 to 1.05:1. Still more preferably, the
molar ratio of PMDA:4,4'-ODA is in a range of from 1:1.03
to 1.03:1. Most preferably the molar ratio of PMDA:4,4'-
ODA is in a range of from 1:1.01 to 1.01:1, or about 1:1.

The polyimide to be treated may further comprise addi-
tional repeat units besides those derived from PMDA and
4,4'-ODA. Suitable additional repeat units include those
derived from dianhydride monomers such as 2,3,6,7-naph-
thalenetetracarboxylic acid dianhydride, 3,3',4,4'-diphe-
nyltetracarboxylic acid dianhydride, 1,2,5,6-naphthalenetet-
racarboxylic acid dianhydride, 2,2',3,3'-
diphenyltetracarboxylic acid dianhydride, 2,2-bis-(3,4-
dicarboxyphenyl)-propane dianhydride, bis-(3,4-
dicarboxyphenyl)-sulfone dianhydride, bis-(3,4-
dicarboxyphenyl)-ether dianhydride, 2,2-bis-(2,3-
dicarboxyphenyl)-propane dianhydride, 1,1-bis-(2,3-
dicarboxyphenyl)-ethane dianhydride, 1,1-bis-(3,4-
dicarboxyphenyl)-ethane dianhydride, bis-(2,3-
dicarboxyphenyl)-methane dianhydride, bis-(3,4-
dicarboxyphenyl)-methane dianhydride, 3,4,3',4'-
benzophenonetetracarboxylic acid dianhydridex,
benzophenonetetracarboxylic acid dianhydride (BTDA) or
diphenyltetracarboxylic acid dianhydride (BPDA), or a mix-
ture thereof. Suitable additional repeat units include those
derived from 4,4'-diaminodiphenylpropane, 4,4'-diaminodi-
phenylmethane, 4,4'-diaminodiphenylamine, benzidine,
4,4'-diaminodiphenyl sulfide, 4,4'-diaminodiphenyl sulfone,
3,3'-diaminodiphenyl sulfone, 4,4'-diaminodiphenyl ether,
bis-(4-aminophenyl)diethylsilane, bis-(4-aminophenyl)-
phenylphosphine oxide, bis-(4-aminophenyl)-N-methylam-
ine, 1,5-diaminonaphthalene, 3,3'-dimethyl-4,4'-diaminobi-
phenyl, 3,3'-dimethoxybenzidine, 1,4-bis-(p-
aminophenoxy)-benzene, 1,3-bis-(p-aminophenoxy)-
benzene, m-phenylenediamine (MPD), p-phenylenediamine
(PPD), or any mixture thereof.

The polyimide to be treated preferably does not comprise
additional repeat units besides those derived from PMDA
and 4,4'-ODA. Thus, the polyimide to be treated is prefer-
ably a co-polymer of PMDA and 4,4'-ODA. As used herein
the term poly(PMDA-co-4,4'-ODA) refers to a co-polymer
of PMDA and 4,4'-ODA, which does not comprise addi-
tional repeat units besides those derived from PMDA and
4,4'-ODA.

The polyimide to be treated may comprise end capping
units, such as units that may be derived from phthalic
anhydride or acetic anhydride, preferably from acetic anhy-
dride. Such end capping units are not additional repeat units.

The polyimide to be treated is typically not a gel. The
polyimide to be treated is typically not an aerogel.

The polyimide to be treated is typically in powder form. As used herein the term powder refers to any form where the polyimide is present as a plurality of particles and includes, for example, dry powders as well as wet aggregations comprising the polyimide to be treated.

As used herein a wet aggregation comprising the polyimide to be treated typically comprises the polyimide to be treated and liquid media. Said liquid media may comprise liquids used in the preparation of the polyimide to be treated (e.g. liquids used in the preparation methods disclosed in U.S. Pat. Nos. 3,249,588, 3,179,631 and/or 4,755,555 or any combination of such liquid(s)) such as for example solvents, wash liquids, unused reagents (including for example monomers and end capping agents).

When in powder form, the polyimide to be treated typically has a particle size characterised by a volume median diameter (Dv50) of 10 to 80 µm. Preferably, the particle size may be characterised by a Dv50 of 20 to 70 µm. More preferably, the particle size may be characterised by a Dv50 of 25 to 60 µm. As described elsewhere herein, the polyimide to be treated may comprise an encapsulated filler. The typical, preferable, more preferable, still more preferable and most preferable particle sizes described above apply to embodiments where the polyimide to be treated comprises an encapsulated filler and embodiments where the polyimide to be treated does not comprise an encapsulated filler.

The Dv50 values referred to herein are typically as measured by laser diffraction in deionised water in accordance with ISO13320:2009.

The polyimide to be treated may comprise an encapsulated filler. In embodiments where the polyimide to be treated comprises an encapsulated filler, the encapsulated filler is typically graphite.

Particles of the filler encapsulated within the polyimide to be treated typically have a Dv90 of 2.0 to 10.0 µm, preferably 3 to 9 µm, more preferably 4.0 to 8.0 µm, and most preferably 5.0 to 7.0 µm.

The amount of encapsulated filler present in the polyimide to be treated is typically 5 to 60 wt %, such as 10 to 20 wt % or 35 to 45 wt %, preferably 12 to 18 wt % or 37 to 43 wt %, more preferably 14 to 16 wt % or 39 to 41 wt % and most preferably about 15 wt % or about 40 wt %, relative to the weight of the polyimide to be treated.

The polyimide to be treated can be prepared by methods known in the art, for example the methods described in U.S. Pat. Nos. 3,249,588, 3,179,631 and 4,755,555 or by analogy with such known methods.

As used herein the contacting step refers to the step of the method of the present invention in which the polyimide to be treated is contacted with the fluid to obtain a treated polyimide. The term "conditions of the contacting step" typically refers to the temperature and pressure at which the polyimide to be treated is contacted with the fluid.

The contacting step may be carried out following preparation of the polyimide to be treated. Known preparation methods (e.g. methods disclosed in U.S. Pat. Nos. 3,249, 588, 3,179,631, and/or 4,755,555) typically include a step of precipitating the polyimide. Subsequent to the step of precipitating the polyimide, the known preparation methods typically include a step of washing the polyimide, a step of drying the polyimide under vacuum and/or a step of heating the polyimide (e.g. to a temperature above 160° C.). At the time of carrying out the contacting step in method of the present invention, the polyimide to be treated has typically not been subjected to a step of drying the polyimide under vacuum and/or a step of heating the polyimide (e.g. to a temperature above 160° C.) for a time sufficient to remove substantially all liquid media from the polyimide to be treated. In this context liquid media refers to liquids used in the preparation of the polyimide to be treated (e.g. liquids used in the preparation methods disclosed in U.S. Pat. Nos. 3,249,588, 3,179,631 and/or 4,755,555 or any combination of such liquid(s)) such as for example solvents, wash liquids, unused reagents (including for example monomers and end capping agents). In this context removal of substantially all liquid media refers to removal of liquid media to the extent that said liquid media are present in an amount of 25.0 wt % or less, 15.0 wt % or less, 10.0 wt % or less, 5.0 wt % or less, e.g 2.5 wt % or less, 1 wt % or less, 0.8 wt % or less, 0.6 wt % or less, 0.4 wt % or less, 0.2 wt % or less, or 0.1 wt % or less, relative to the weight of the polyimide to be treated.

The contacting step may be carried out substantially immediately after the polyimide to be treated has been prepared, or the contacting step may be carried out following an interval after the polyimide to be treated has been prepared. In this context, reference to the polyimide having been prepared may refer to the point at which a precipitation step has been completed, the point at which a washing step has been completed, or the point at which the step of drying the polyimide (e.g. under vacuum conditions) has been completed. In embodiments where the contacting step is carried out following an interval after the polyimide to be treated has been prepared, the interval may for example be 1 year or less, 6 months or less, 4 months or less, 2 months or less, 1 month or less, 2 weeks or less, 1 week or less, 72 hours or less, 48 hours or less, 24 hours or less, 12 hours or less, 6 hours or less, 4 hours or less, 3 hours or less, 2 hours or less, 1 hour or less, 45 minutes or less, 30 minutes or less, 20 minutes or less, 10 minutes or less, or 5 minutes or less. The polyimide to be treated may be in the form of a wet aggregation, as described herein, for the duration of the interval.

The contacting step may be carried out under any suitable conditions, provided that the fluid with which the polyimide to be treated is contacted comprises a supercritical fluid and/or a liquid with the desired low surface tension (e.g. 10.0 mN m$^{-1}$ or less or as described elsewhere herein) under those conditions. A skilled person will be able to determine suitable conditions for any particular fluid.

The contacting step may for instance be carried out at pressure of 5 to 500 bar, typically 25 to 400 bar, preferably 50 to 300 bar, more preferably 100 to 200 bar, still more preferably 140 to 160 bar or most preferably about 150 bar.

The contacting step may for instance be carried out at a temperature of 20 to 200° C., typically 40 to 150° C., preferably 60 to 100° C., more preferably 70 to 90° C., still more preferably 75 to 85° C. and most preferably about 80° C.

The duration of the contacting step is not particularly limited. A skilled person can readily select an appropriate duration based, for example, on the batch size. The duration of the contacting step may be for instance 1 minute or more, 5 minutes or more, 10 minutes or more, 20 minutes or more, 30 minutes or more, 45 minutes or more, 1 hour or more, 2 hours or more, 3 hours or more, 4 hours or more, or 5 hours or more. The duration of the contacting step may for instance be 24 hours or less, 12 hours or less, 6 hours or less, 4 hours or less, 3 hours or less, 2 hours or less, 1 hour or less, 45 minutes or less, 30 minutes or less, 20 minutes or less, 10 minutes or less, or 5 minutes or less. The duration may be in a range between any applicable combination of upper and lower limits described above.

The contacting step may comprise flowing the fluid over the polyimide to be treated. The contacting step may comprise immersing the polyimide to be treated in the fluid.

In embodiments where the fluid is flowed over the polyimide to be treated, the duration may be determined by the combination of the flow rate of the fluid and the desired amount of fluid to be contacted with the polyimide to be treated. In embodiments where the polyimide to be treated is present in an aggregation comprising polyimide particles and liquid media, the desired amount of fluid is typically determined based on the combined mass of the polyimide particles and liquid media. For example, the ratio of the mass of the fluid with which the polyimide to be treated is contacted, to the combined mass of the polyimide particles and liquid media may typically be in a range of 1:1 to 25:1, preferably 2:1 to 20:1, more preferably 4:1 to 15:1, still more preferably 6:1 to 10:1, most preferably about 8:1. Said liquid media may comprise liquids used in the preparation of the polyimide to be treated (e.g. liquids used in the preparation methods disclosed in U.S. Pat. Nos. 3,249,588, 3,179,631 and/or 4,755,555 or any combination of such liquid(s)) such as for example solvents, wash liquids, unused reagents (including for example monomers and end capping agents).

In embodiments where the fluid is flowed over the polyimide to be treated, the flow rate of the fluid is not particularly limited. A skilled person can readily select an appropriate flow rate based on, for example, the batch size and the desired amount of fluid to be contacted with the polyimide to be treated. The flow rate of the fluid may be for example 0.5 kg of fluid per minute or more, 1 kg of fluid per minute or more, 2 kg of fluid per minute or more, 3 kg of fluid per minute or more, 4 kg of fluid per minute or more, 5 kg of fluid per minute or more, 6 kg of fluid per minute or more, 7 kg of fluid per minute or more, 8 kg of fluid per minute or more, 9 kg of fluid per minute or more, 10 kg of fluid per minute or more, or 25 kg of fluid per minute or more. The flow rate of the fluid may for example be 50 kg of fluid per minute or less, 30 kg of fluid per minute or less, 15 kg of fluid per minute or less, 12 kg of fluid per minute or less, 10 kg of fluid per minute or less, 9 kg of fluid per minute or less, 8 kg of fluid per minute or less, 7 kg of fluid per minute or less, 6 kg of fluid per minute or less, 5 kg of fluid per minute or less, 3 kg of fluid per minute or less, 2 kg of fluid per minute or less, or 1 kg of fluid per minute or less. The flow rate may be in a range between any applicable combination of upper and lower limits described above, e.g. 25 to 50 kg of fluid per minute, and would ultimately be determined by the batch size and/or the size of the plant utilised to perform the extraction.

Apparatus suitable for contacting solids with fluids are known in the art and a skilled person will be able to select an appropriate apparatus. For example, in embodiments where the fluid comprises a supercritical liquid, supercritical extraction apparatus may be used. Suitable supercritical extraction apparatus are commercially available and well known in fields such as decaffeination of coffee and extraction of cannabidiol from *cannabis*.

"The fluid" referred to herein is the fluid with which the polyimide to be treated is contacted in the contacting step, unless context indicates otherwise. The fluid comprises a supercritical fluid or a low-surface tension liquid. As used herein, the term "low surface tension liquid" refers to a liquid having a surface tension of 10.0 mN m$^{-1}$ or less under the conditions of the contacting step. As used herein, the term "supercritical fluid" refers to a substance at a temperature and pressure above its critical point, the critical point of a substance being the highest temperature and pressure at which both a gaseous and a liquid phase of the substance can coexist.

The fluid used in the contacting step may comprise a low surface tension liquid. As used herein the term "surface tension" when used to describe a liquid refers to the liquid-air surface tension. The surface tension of a liquid under the conditions of the contacting step may be determined experimentally according to the procedure described by Chen et al.; *Measuring Surface Tension of Liquids at High Temperature and Elevated Pressure*; J. Chem. Eng. Data 2008, 53, 742-744, or may be calculated empirically by the techniques described by J. R. Brock and R. B. Bird (AICHE Journal 1, 174 (1955)), D. I. Hakim, D. Steinberg, and L. I. Stiel, (Ind. Eng. Chem. Fundam. 10, 174 (1971)), C. Miqueu, D. Broseta, J. Satherley, B. Mendiboure, J. Lachaise, and A. Gracia, (Fluid Phase Equil. 172, 169 (2000)), or Y.-X. Zuo and E. H. Stenby, (Can. J. Chem. Eng. 75, 1130 (1997)).

The low surface tension liquid has a surface tension of 10.0 mN m$^{-1}$ or less under the conditions of the contacting step, and typically has a surface tension of 8.5 mN m$^{-1}$ or less under the conditions of the contacting step, preferably 8.5 or less, more preferably 6.0, still more preferably 4.5 or less, even more preferably 2.0 or less, and most preferably 1.0 or less.

When the contacting step is carried out over a range of temperatures and/or pressures, a liquid is considered to have a specific surface tension under the conditions of the contacting step if the liquid has that specific surface tension at a temperature and/or pressure within the range of temperatures and/or pressures over which the contacting step is carried out.

Suitable substances for the supercritical fluid include methane, ethane, ethylene, carbon dioxide, nitrous oxide, and mixtures thereof.

Suitable substances for the low surface tension liquid include methane, ethane, ethylene, carbon dioxide, nitrous oxide, and mixtures thereof.

Typically the fluid comprises supercritical $CO_2$ and/or low surface tension liquid $CO_2$. Preferably the fluid comprises supercritical $CO_2$, i.e. the fluid comprises supercritical $CO_2$, the temperature of the contacting step is 31.0° C. or more, and the pressure of the contacting step is 73.8 bar or more (i.e. the contacting step is carried out above the critical point of $CO_2$). More preferably, the fluid comprises supercritical $CO_2$ and the conditions of the contacting step comprise a temperature of 60 to 100° C. and a pressure of 100 to 200 bar. Still more preferably the fluid comprises supercritical $CO_2$ and the conditions of the contacting step comprise a temperature of 70 to 90° C. and a pressure of 140 to 160 bar. Most preferably the fluid comprises supercritical $CO_2$ and the conditions of the contacting step comprise a temperature of about 80° C. and a pressure of about 150 bar.

When the fluid comprises low surface tension liquid $CO_2$, the conditions of the contacting step typically comprise a temperature of −40.0° C. or more and a pressure of 10.0 bar or more, e.g. a temperature of −40.0° C. or more and less than 31.0° C., and a pressure of 10.0 bar or more and less than 73.8 bar.

In addition to the supercritical fluid and/or low surface tension liquid, the fluid may further comprise a co-solvent. Easily removed by the process or by subsequent drying. Suitable co-solvents may include ethanol, isopropyl alcohol, acetone, and toluene.

The polyimide is typically chemically unchanged by the contacting step. Thus, the chemical composition of the treated polyimide is typically the same as that of the polyimide to be treated, as described above.

The physical properties of the treated polyimide are typically improved as a result of the contacting step. The BET specific surface area of the treated polyimide is typically greater than that of the polyimide to be treated. The BET specific surface area of the treated polyimide is typically greater than that of polyimide washed by solvents previously known in the art.

BET specific surface areas referred to herein are typically determined according to ISO 9211:2010 using multi-point determination with $N_2$ Technical X47S as the adsorptive with a purity of 99.999%, impurities present as $H_2O<3$ ppm, impurities present as $O_2<5$ ppm.

Without wishing to be bound by theory, it is believed that the use of a supercritical fluid and/or low surface tension liquid will interact with pores within the polyimide to be treated to increase the BET specific surface area, and that an increased BET specific surface area results in increased tensile strength when the polyimide is formed into a product. The fluid used in the present invention is thought to be much more effective at extracting residual liquid media from the pores and nanofluidic channels of the polyimide following the polyimide production process.

Preparation of the polyimide typically comprises polymerising a diamine and a dianhydride to form a poly(amide-acid), followed by condensation of the groups in the polyamide-acid to form a polyimide. Although reference is generally made herein to contacting a polyimide with the fluid, embodiments of the invention are disclosed herein in which the polyamide-acid (e.g. solid polyamide-acid such as in the form of a precipitate) is contacted with the fluid, and subsequently converted to a polyimide. Such embodiments are typically as described herein with respect to embodiments in which the polyimide is contacted with the fluid, with the exception that the contacting step comprises contacting the polyamide-acid (e.g. solid polyamide-acid such as in the form of a precipitate) to be treated with the fluid to obtain a treated polyamide-acid, and that the method further comprises a step of converting the treated polyamide acid into a treated polyimide. Thus, in such embodiments, the present invention provides a method of treating a polyimide, comprising: providing a polyamide-acid to be treated; contacting the polyamide-acid to be treated with a fluid to obtain a treated polyamide-acid; and converting the treated polyamide acid into a treated polyimide; wherein the polyimide comprises a first repeat unit derived from pyromellitic dianhydride (PMDA) and a second repeat unit derived from 4,4'-oxodianiline (4,4'-ODA); and wherein the fluid comprises a supercritical fluid, a liquid with a surface tension of 10.0 mN m$^{-1}$ or less under the conditions of the contacting step, or a mixture thereof.

Conversion of the polyamide-acid into a polyimide can be carried out by known methods, e.g. as disclosed in U.S. Pat. Nos. 3,179,631 and/or 4,755,555, for example by heat treatment at a temperature of 160° C. or higher, e.g. at a temperature in the range from 160° C. to 200° C.

The treated polyimide is typically in powder form. The particle size of the treated polyimide is typically as described above with reference to the polyimide to be treated.

The method of the present invention may comprise an optional further step of mixing the treated polyimide with an additive to obtain a polyimide mixture. The mixing may comprise dry blending with an additive (e.g. blending with an additive after drying the treated polyimide). Suitable additives include moulding additives and lubricants. For example, PTFE may be mixed with the treated polyimide in an amount of from 0.1 wt % to 15 wt % relative to the weight of the polyimide to be treated. PTFE is typically present as a moulding additive and/or a lubricant. In another example, $MoS_2$ may be mixed with the treated polyimide powder in an amount of typically from 0.1 wt % to 15 wt % relative to the weight of the polyimide to be treated. $MoS_2$ is typically present as a lubricant.

The method of the present invention may comprise an optional further step of forming the treated polyimide and/or polyimide mixture to obtain a formed polyimide product.

Suitable forming techniques may include direct forming, hot isostatic pressing, hot compression moulding, and ram extrusion (optionally with subsequent Hot Isostatic Pressing).

Direct forming, hot isostatic pressing, hot compression moulding, and ram extrusion techniques are known in the art and a skilled person will be able to carry out a suitable technique to obtain a desired formed product, for example in accordance with the techniques described in U.S. Pat. Nos. 3,413,394, 4,238,538, and Canadian Pat 890515.

For example, direct formed products may be obtained by direct forming at a pressure of 10,000 to 500,000 psi (e.g. 50,000 to 200,000 psi, 75,000 to 125,000 psi or about 100,000 psi), followed by firing at 200 to 600° C. (e.g. 250 to 550° C., 300 to 500° C., 350 to 450° C. or about 400° C.).

Hot compression moulded products may be formed, for example, by hot compression moulding at high temperature and pressure for 1 hour or more, 2 hours or more, 3 hours or more, 4 hours or more, or 5 hours or more, 24 hours or less, 12 hours or less, 6 hours or less, 4 hours or less, 3 hours or less, 2 hours or less, or any applicable combination of upper and lower limits described above. Pressure for hot compression moulding may be in a range of 10,000 to 500,000 psi (e.g. 50,000 to 200,000 psi, 75,000 to 125,000 psi or about 100,000 psi). Temperature for hot compression moulding may be in a range of 200 to 600° C. (e.g. 250 to 550° C., 300 to 500° C., 350 to 450° C. or about 400° C.). The hot compression moulding step may be followed by a machining step (e.g. to obtain a precise size and/or shape). Suitable techniques are described in U.S. Pat. No. 3,413,394.

Ram extruded (that may optionally be subsequently hot isostatically pressed) products may be formed, for example, by ram extruding in a die having (a) a compaction zone, followed by (b) a back pressure zone, followed by (c) a relief zone, and in particular carrying out the steps of: (1) compacting the polyimide in the compaction zone, at a temperature in a range of 20 to 600° C. (e.g. 250 to 550° C., 300 to 500° C., 350 to 450° C. or about 400° C.), while simultaneously (2) providing back pressure on the polyimide at the exit of the compaction zone by moving the compacted polyimide through the back pressure zone, and, thereafter, (3) relieving the pressure on the polyimide in the relief zone to control the rate of elastic recovery thereof. The process typically resulting in a radial recovery of the compacted polyimide of about 3 to 5 percent as such compacted polyimide is moved through the relief zone to form the formed product. Suitable techniques are described in U.S. Pat. No. 4,238,538.

The ram extruded crystalline polyimide product of the present invention includes ram extruded crystalline polyimide products which have been hot isostatically pressed subsequent to ram extrusion, and also includes ram extruded crystalline polyimide products which have not been hot isostatically pressed subsequent to ram extrusion.

Hot isostatic pressed products may be formed, for example, by compacting the polyimide into a preform, and then compacting the preform isostatically in an inert molten metal at high pressure to its desired density while sintering it, with or without heat treatment between the two compacting steps. The inert molten metal may for example be molten lead. The pressure of the isostatic compacting step may be in a range of 1,000 to 50,000 psi (e.g. 5,000 to 20,000 psi, 7,500 to 12,500 psi or about 10,000 psi). The temperature of the sintering and the optional heat treatment steps may be in a range of 200 to 600° C. (e.g. 250 to 550° C., 300 to 500° C., 350 to 450° C. or about 400° C.). Suitable techniques are described in CA890515.

The treated polyimide may be dried prior to forming into a formed polyimide product, e.g. at a temperature of 100° C. to 200° C. Drying may take place in air, in an inert atmosphere (e.g. $N_2$) or under vacuum.

The present invention also provides a polyimide.

The polyimide of the invention may be a treated polyimide obtainable by the method of the invention.

The polyimide of the present invention may be a polyimide having a BET specific surface area greater than 100 $m^2$ $g^{-1}$, wherein the polyimide comprises a first repeat unit derived from pyromellitic dianhydride (PMDA) and a second repeat unit derived from 4,4'-oxodianiline (4,4'-ODA), and wherein the polyimide does not comprise a encapsulated filler or comprises an encapsulated filler in an amount of 20 wt % or less (e.g. 16 wt % or less) relative to the weight of the polyimide.

The polyimide of the present invention may be a polyimide having a BET specific surface area greater than 70 $m^2$ $g^{-1}$ (e.g. 85 $m^2$ $g^{-1}$ or greater), wherein the polyimide comprises a first repeat unit derived from pyromellitic dianhydride (PMDA) and a second repeat unit derived from 4,4'-oxodianiline (4,4'-ODA), and wherein the treated polyimide comprises an encapsulated filler in an amount of 20 wt % to 60 wt % (e.g. 16 wt % to 60 wt %) relative to the weight of the polyimide.

The polyimide of the present invention may be a powder, e.g. dry powder. When in powder form (e.g. dry powder form), the polyimide may have a BET specific surface area greater than 100 $m^2$ $g^{-1}$, for example in embodiments where the polyimide does not comprise an encapsulated filler. Typically, and particularly in embodiments where the polyimide does not comprise an encapsulated filler, the polyimide of the present invention has a BET specific surface area of 110 $m^2$ $g^{-1}$ or more, preferably 120 $m^2$ $g^{-1}$ or more, more preferably 130 $m^2$ $g^{-1}$ or more, still more preferably 140 $m^2$ $g^{-1}$ or more, most preferably 150 $m^2$ $g^{-1}$ or more.

In embodiments where the polyimide comprises an encapsulated filler, e.g. in an amount of 10 wt % to 20 wt % relative to the weight of the polyimide, the polyimide of the present invention typically has a BET specific surface area of 100 $m^2$ $g^{-1}$ or more, preferably 105 $m^2$ $g^{-1}$ or more, more preferably 110 $m^2$ $g^{-1}$ or more, still more preferably 115 $m^2$ $g^{-1}$ or more.

In embodiments where the polyimide comprises an encapsulated filler, e.g. in an amount of 20 wt % to 60 wt % relative to the weight of the polyimide, the polyimide of the present invention typically has a BET specific surface area of 70 $m^2$ $g^{-1}$ or more, preferably 75 $m^2$ $g^{-1}$ or more, more preferably 80 $m^2$ $g^{-1}$ or more, still more preferably 85 $m^2$ $g^{-1}$ or more, most preferably 90 $m^2$ $g^{-1}$ or more.

The presence of an encapsulated filler within the polyimide resin typically reduces the BET specific surface area of the polyimide compared to a polyimide which does not comprise an encapsulated filler. However the BET specific surface area of a polyimide according to the present invention which comprises an encapsulated filler will typically be greater than was achievable for the same amount of encapsulated filer prior to the present invention.

The polyimide may have a BET specific surface area of 500 $m^2$ $g^{-1}$ or less, e.g. 400 $m^2$ $g^{-1}$ or less, 300 $m^2$ $g^{-1}$ or less, 200 $m^2$ $g^{-1}$ or less, 150 $m^2$ $g^{-1}$ or less, or 100 $m^2$ $g^{-1}$ or less.

BET specific surface areas referred to herein are typically determined according to ISO 9277:2010 using multi-point determination with $N_2$ Technical X47S as the adsorptive with a purity of 99.999%, impurities present as $H_2O$<3 ppm, impurities present as $O_2$<5 ppm.

The polyimide of the present invention may be in powder form, and typically has a particle size characterised by a volume median diameter (Dv50) of 10 to 80 μm. Preferably, the particle size may be characterised by a Dv50 of 20 to 70 μm. More preferably, the particle size may be characterised by a Dv50 of 25 to 60 μm.

In embodiments where the polyimide does not comprise an encapsulated filler, the polyimide of the present invention may have a particle size (Dv50) of 10 to 80 μm, preferably 20 to 70 μm, more preferably 35 to 60 μm still more preferably 45 to 50 μm, most preferably about 47.5 μm.

In embodiments where the polyimide comprises an encapsulated filler in an amount of 10 wt % to 20 wt % relative to the weight of the polyimide, the polyimide of the present invention may have a particle size (Dv50) of 10 to 80 μm, preferably 20 to 70 μm, more preferably 25 to 50 μm, still more preferably 35 to 40 μm, and most preferably about 38 μm.

In embodiments where the polyimide comprises an encapsulated filler in an amount of 20 wt % to 60 wt % relative to the weight of the polyimide, the polyimide of the present invention may have a particle size (Dv50) of 10 to 80 μm, preferably 20 to 50 μm, more preferably 25 to 45 μm.

The polyimide of the present invention may have a BET specific surface area as described above and a particle size (Dv50) as descried above. Combinations of all the BET specific surface areas described above with any of the Dv50 particle sizes described above are disclosed. For example, particularly in embodiments where the polyimide does not comprise an encapsulated filler, the polyimide of the present invention may have a particle size (Dv50) of 10 to 80 μm and a BET specific surface area greater than 100 $m^2$ $g^{-1}$ (e.g. 100 to 500 $m^2$ $g^{-1}$, 100 to 400 $m^2$ $g^{-1}$, 100 to 300 $m^2$ $g^{-1}$, 100 to 200 $m^2$ $g^{-1}$); a particle size (Dv50) of 20 to 70 μm and a BET specific surface area of 110 $m^2$ $g^{-1}$ or more (e.g. 110 to 500 $m^2$ $g^{-1}$, 110 to 400 $m^2$ $g^{-1}$, 110 to 300 $m^2$ $g^{-1}$, 110 to 200 $m^2$ $g^{-1}$); a particle size (Dv50) of 35 to 60 μm and a BET specific surface area of 120 $m^2$ $g^{-1}$ or more (e.g. 120 to 500 $m^2$ $g^{-1}$, 120 to 400 $m^2$ $g^{-1}$, 120 to 300 $m^2$ $g^{-1}$, 120 to 200 $m^2$ $g^{-1}$); a particle size (Dv50) of 45 to 50 μm and a BET specific surface area of 130 $m^2$ $g^{-1}$ or more (e.g. 130 to 500 $m^2$ $g^{-1}$, 130 to 400 $m^2$ $g^{-1}$, 130 to 300 $m^2$ $g^{-1}$, 130 to 200 $m^2$ $g^{-1}$); or a particle size (Dv50) of about 47.5 μm and a BET specific surface area of 130 $m^2$ $g^{-1}$ or more (e.g. 130 to 500 $m^2$ $g^{-1}$, 130 to 400 $m^2$ $g^{-1}$, 130 to 300 $m^2$ $g^{-1}$, 130 to 200 $m^2$ $g^{-1}$).

In embodiments where the polyimide comprises an encapsulated filler in an amount of 10 wt % to 20 wt % relative to the weight of the polyimide, the polyimide of the present invention may have a particle size (Dv50) of 10 to 80 μm and a BET specific surface area greater than 100 $m^2$ $g^{-1}$ (e.g. 100 to 450 $m^2$ $g^{-1}$, 100 to 350 $m^2$ $g^{-1}$, 100 to 250 $m^2$ $g^{-1}$, 100 to 150 $m^2$ $g^{-1}$); a particle size (Dv50) of 20 to 70 μm and a BET specific surface area of 105 $m^2$ $g^{-1}$ or more (e.g. 105 to 450 $m^2$ $g^{-1}$, 105 to 350 $m^2$ $g^{-1}$, 105 to 250 $m^2$ $g^{-1}$, 105 to 150 $m^2$ $g^{-1}$); a particle size (Dv50) of 25 to 50 μm and a BET specific surface area of 110 $m^2$ $g^{-1}$ or more (e.g. 110 to 450 m$^2$ g$^{-1}$, 110 to 350 m$^2$ g$^{-1}$, 110 to 250 m$^2$ g$^{-1}$, 110 to 150 m$^2$ g$^{-1}$); a particle size (Dv50) of 35 to 40 μm and a BET specific surface area of 115 m$^2$ g$^{-1}$ or more (e.g. 115 to 450 m$^2$ g$^{-1}$, 115 to 350 m$^2$ g$^{-1}$, 115 to 250 m$^2$ g$^{-1}$, 115 to 150 m$^2$ g$^{-1}$); or a particle size (Dv50) of about 38 μm and a BET specific surface area of 115 m$^2$ g$^{-1}$ or more (e.g. 115 to 450 m$^2$ g$^{-1}$, 115 to 350 m$^2$ g$^{-1}$, 115 to 250 m$^2$ g$^{-1}$, 115 to 150 m$^2$ g$^{-1}$).

In embodiments where the polyimide comprises an encapsulated filler in an amount of 20 wt % to 60 wt % relative to the weight of the polyimide, the polyimide of the present invention may have a particle size (Dv50) of 10 to 80 μm and a BET specific surface area greater than 70 m$^2$ g$^{-1}$ (e.g. 70 to 200 m$^2$ g$^{-1}$, 70 to 150 m$^2$ g$^{-1}$, 70 to 100 m$^2$ g$^{-1}$, 85 to 200 m$^2$ g$^{-1}$, 85 to 150 m$^2$ g$^{-1}$, 85 to 100 m$^2$ g$^{-1}$); a particle size (Dv50) of 20 to 50 μm and a BET specific surface area of 75 m$^2$ g$^{-1}$ or more (e.g. 75 to 200 m$^2$ g$^{-1}$, 75 to 150 m$^2$ g$^{-1}$, 75 to 100 m$^2$ g$^{-1}$, 85 to 200 m$^2$ g$^{-1}$, 85 to 150 m$^2$ g$^{-1}$, 85 to 100 m$^2$ g$^{-1}$); a particle size (Dv50) of 25 to 40 μm and a BET specific surface area of 80 m$^2$ g$^{-1}$ or more (e.g. 80 to 200 m$^2$ g$^{-1}$, 80 to 150 m$^2$ g$^{-1}$, 80 to 100 m$^2$ g$^{-1}$); a particle size (Dv50) of 25 to 40 μm and a BET specific surface area of 85 m$^2$ g$^{-1}$ or more (e.g. 85 to 200 m$^2$ g$^{-1}$, 85 to 150 m$^2$ g$^{-1}$, 85 to 100 m$^2$ g$^{-1}$); or a particle size (Dv50) of 25 to 40 μm and a BET specific surface area of 90 m$^2$ g$^{-1}$ or more (e.g. 90 to 200 m$^2$ g$^{-1}$, 90 to 150 m$^2$ g$^{-1}$, 90 to 100 m$^2$ g$^{-1}$).

The polyimide of the present invention may comprise an encapsulated filler. The encapsulated filler in the polyimide of the present invention is typically as described elsewhere herein with reference to the method of the present invention. The typical, preferable, more preferable, still more preferable and most preferable particle sizes described above apply to embodiments where the polyimide of the present invention comprises an encapsulated filler and embodiments where the polyimide to be treated does not comprise an encapsulated filler. The Dv50 values referred to herein are typically as measured by laser diffraction in deionised water in accordance with ISO13320:2009.

The polyimide of the present invention is typically a crystalline polyimide. As used herein the term crystalline refers to a polyimide with a crystallinity index of 15.0 or greater in embodiments where the polyimide does not comprise an encapsulated filler and embodiments where the polyimide comprises an encapsulated filler in an amount of up to 20 wt % relative to the weight of the polyimide (e.g. 10 wt % to 20 wt % relative to the weight of the polyimide), and to a polyimide with a crystallinity index of 17.0 or greater in embodiments where the polyimide comprises an encapsulated filler in an amount of 20 wt % or more relative to the weight of the polyimide (e.g. 20 wt % to 60 wt % relative to the weight of the polyimide).

In embodiments where the polyimide does not comprise an encapsulated filler and embodiments where the polyimide comprises an encapsulated filler in an amount of 10 wt % to 20 wt % relative to the weight of the polyimide, the crystallinity index of the polyimide of the present invention is typically 15.0 or greater, e.g. 15.5 or greater, 16.0 or greater, 16.5 or greater, 17.0 or greater, 17.5 or greater, 18.0 or greater, 20.0 or greater, 22.0 or greater, 24.0 or greater, 26.0 or greater, 28.0 or greater, or 30.0 or greater.

In embodiments where the polyimide comprises an encapsulated filler in an amount of 20 wt % to 60 wt % relative to the weight of the polyimide, the crystallinity index of the polyimide of the present invention is typically 17.0 or greater, e.g. 17.5 or greater, 18.0 or greater, 18.5 or greater, 19.0 or greater, 19.5 or greater, 20.0 or greater, 22.0 or greater, 24.0 or greater, 26.0 or greater, 28.0 or greater, 30.0 or greater.

The crystallinity index of the polyimide of the present invention may be 90.0 or less, e.g. 80.0 or less, 70.0 or less, 60.0 or less, or 50.0 or less.

The crystallinity index of the polyimide of the present invention is typically from 17.0 to 90.0, preferably 20.0 to 80.0, more preferably 25.0 to 70.0, still more preferably 30.0 to 60.0.

The crystallinity index of the polyimide of the present invention is typically measured by differential scanning calorimetry (DSC). Suitable equipment which may be used, for example, is a DSC 1 (Mettler Toledo) with a 70 μl platinum pan with pierced lid. The sample may be for example a 5 mg sample and may be heated from 40° C. to 700° C. at a heating rate of 10° C./min. The degree of crystallinity, a, can then be estimated from the peak area:

$$\alpha = \frac{\Delta h}{\Delta h_c} \cdot 100\%$$

where Δh is the specific enthalpy of fusion (in J/g) of the sample determined from the peak area, and Δh$_c$ is the enthalpy of fusion of a 100% crystalline material. The heat of fusion of the polyimide may be obtained from literature sources, such as "Handbook of Polymers" By George Wypych (2$^{nd}$ edition, 2016, ChemTec Publishing). For poly (PMDA-co-4,4'-ODA) a heat of fusion of 139 J/g may be used.

The present invention also provides a formed polyimide product.

The formed polyimide product of the present invention may be obtainable by methods of the present invention which comprise a step of forming the treated polyimide or polyimide mixture to obtain a formed polyimide product.

The formed polyimide product of the present invention may be a direct formed crystalline polyimide product wherein the polyimide comprises a first repeat unit derived from pyromellitic dianhydride (PMDA) and a second repeat unit derived from 4,4'-oxodianiline (4,4'-ODA), and wherein the direct formed crystalline polyimide product:

does not comprise an encapsulated filler, comprises 0 wt % to 0.5 wt % of an additive relative to the weight of the polyimide, and has a tensile strength of 80.0 MPa or greater (e.g. 85.0 MPa or greater, 90.0 MPa or greater, 95.0 MPa or greater or 100.0 MPa or greater); or comprises 10 wt % to 20 wt % of an encapsulated filler relative to the weight of the polyimide, comprises 0 wt % to 0.5 wt % of an additive relative to the weight of the polyimide, and has a tensile strength of 63.0 MPa or greater (e.g. 69.0 MPa or greater, 74.0 MPa or greater, 79.0 MPa or greater, 84.0 MPa or greater or 89.0 MPa or greater); or comprises 20 wt % to 60 wt % of an encapsulated filler relative to the weight of the polyimide, comprises 0 wt % to 2.0 wt % of an additive relative to the weight of the polyimide, and has a tensile strength of 50.0 MPa or greater (e.g. 55.0 MPa or greater, 60.0 MPa or greater, 65.0 MPa or greater, 70.0 MPa or greater or 75.0 MPa or greater); or comprises 10 wt % to 20 wt % of an encapsulated filler relative to the weight of the polyimide, comprises 5 wt % to 15 wt % of an additive relative to the weight of the polyimide, and has a tensile strength of 52.5 MPa or greater (e.g. 57.5 MPa or greater, 62.5 MPa or greater, 67.5 MPa or greater or 72.5 MPa or greater); or comprises 20 wt % to 60 wt % of an encapsulated filler relative to the weight of the polyimide, comprises 10 wt % to 20 wt % of an additive relative to the weight of the polyimide, and has a tensile strength of 39.5 MPa or greater (e.g. 44.5 MPa or greater, 49.5 MPa or greater, 54.5 MPa or greater or 59.5 MPa or greater).

The formed polyimide product of the present invention may be a direct formed crystalline polyimide product having a tensile strength of 80.0 MPa or greater, wherein the direct formed polyimide product does not comprise an encapsulated filler, and wherein the polyimide comprises a first repeat unit derived from pyromellitic dianhydride (PMDA) and a second repeat unit derived from 4,4'-oxodianiline (4,4'-ODA). Embodiments in which the direct formed polyimide product does not comprise an encapsulated filler may comprise an additive, for example 0.5 wt % or less PTFE relative to the weight of the polyimide. Such additives may aid mould release during the moulding activities with the resin.

The formed polyimide product of the present invention may be a direct formed crystalline polyimide product having a tensile strength of 63.0 MPa or greater (e.g. 69 MPa or greater), wherein the direct formed polyimide product comprises an encapsulated filler (e.g. 15 wt %±1.0 wt % graphite relative to the weight of the polyimide), and wherein the polyimide comprises a first repeat unit derived from pyromellitic dianhydride (PMDA) and a second repeat unit derived from 4,4'-oxodianiline (4,4'-ODA). Embodiments in which the direct formed polyimide product comprises an encapsulated filler (e.g. 15 wt %±1.0 wt % graphite relative to the weight of the polyimide) may comprise an additive, for example 0.5 wt % or less PTFE relative to the weight of the polyimide. Such additives may aid mould release during the moulding activities with the resin.

The formed polyimide product of the present invention may be a direct formed crystalline polyimide product having a tensile strength of 50.0 MPa or greater (e.g. 55 MPa or greater), wherein the direct formed polyimide product comprises an encapsulated filler (e.g. 40 wt %±5.0 wt % graphite relative to the weight of the polyimide), and wherein the polyimide comprises a first repeat unit derived from pyromellitic dianhydride (PMDA) and a second repeat unit derived from 4,4'-oxodianiline (4,4'-ODA). Embodiments in which the direct formed polyimide product comprises an encapsulated filler (e.g. 40 wt %±5.0 wt % graphite relative to the weight of the polyimide) may comprise an additive, for example 2.0 wt % or less PTFE relative to the weight of the polyimide. Such additives may aid mould release during the moulding activities with the resin.

The formed polyimide product of the present invention may be a direct formed crystalline polyimide product having a tensile strength of 52.5 MPa or greater, wherein the direct formed polyimide product comprises an encapsulated filler (e.g. 15 wt %±3.0 wt % graphite relative to the weight of the polyimide) and an additive (e.g. 10 wt % 1.0 wt % PTFE relative to the weight of the polyimide), and wherein the polyimide comprises a first repeat unit derived from pyromellitic dianhydride (PMDA) and a second repeat unit derived from 4,4'-oxodianiline (4,4'-ODA).

The formed polyimide product of the present invention may be a direct formed crystalline polyimide product having a tensile strength of 39.5 MPa or greater, wherein the direct formed polyimide product comprises an encapsulated filler (e.g. 40 wt %±5.0 wt % graphite relative to the weight of the polyimide) and an additive (e.g. 15 wt %±1.0 wt % PTFE relative to the weight of the polyimide), and wherein the polyimide comprises a first repeat unit derived from pyromellitic dianhydride (PMDA) and a second repeat unit derived from 4,4'-oxodianiline (4,4'-ODA).

The formed polyimide product of the present invention may be a hot isostatically pressed crystalline polyimide product, ram extruded (that may optionally be subsequently hot isostatically pressed) crystalline polyimide product, or hot compression moulded crystalline polyimide product, wherein the polyimide comprises a first repeat unit derived from pyromellitic dianhydride (PMDA) and a second repeat unit derived from 4,4'-oxodianiline (4,4'-ODA), and wherein the hot isostatically pressed crystalline polyimide product, ram extruded (that may optionally be subsequently hot isostatically pressed) crystalline polyimide product, or hot compression moulded crystalline polyimide product:

does not comprise an encapsulated filler, comprises 0 wt % to 0.5 wt % of an additive relative to the weight of the polyimide, and has a tensile strength of 87.0 MPa or greater (e.g. 92.0 MPa or greater, 97.0 MPa or greater, 102.0 MPa or greater or 107.0 MPa or greater); or comprises 10 wt % to 20 wt % of an encapsulated filler relative to the weight of the polyimide, comprises 0 wt % to 0.5 wt % of an additive relative to the weight of the polyimide, and has a tensile strength of 66.0 MPa or greater (e.g. 71.0 MPa or greater, 76.0 MPa or greater, 81.0 MPa or greater or 86.0 MPa or greater); or comprises 20 wt % to 60 wt % of an encapsulated filler relative to the weight of the polyimide, comprises 0 wt % to 2.0 wt % of an additive relative to the weight of the polyimide, and has a tensile strength of 52.5 MPa or greater (e.g. 57.5 MPa or greater, 62.5 MPa or greater, 67.5 MPa or greater or 72.5 MPa or greater); or comprises 10 wt % to 20 wt % of an encapsulated filler relative to the weight of the polyimide, comprises 5 wt % to 15 wt % of an additive relative to the weight of the polyimide, and has a tensile strength of 49.5 MPa or greater (e.g. 54.5 MPa or greater, 59.5 MPa or greater, 64.5 MPa or greater or 69.5 MPa or greater); or does not comprise an encapsulated filler, comprises 10 wt % to 20 wt % of an additive relative to the weight of the polyimide, and has a tensile strength of 59.0 MPa or greater (e.g. 64.0 MPa or greater, 69.0 MPa or greater, 74.0 MPa or greater or 79.0 MPa or greater); or comprises 20 wt % to 60 wt % of an encapsulated filler relative to the weight of the polyimide, comprises 10 wt % to 20 wt % of an additive relative to the weight of the polyimide, and has a tensile strength of 39.5 MPa or greater (e.g. 44.5 MPa or greater, 49.5 MPa or greater, 54.5 MPa or greater or 59.5 MPa or greater).

The formed polyimide product of the present invention may be a hot isostatically pressed crystalline polyimide product, a ram extruded (that may optionally be subsequently hot isostatically pressed) crystalline polyimide product, or a hot compression moulded crystalline polyimide product, said formed polyimide product having a tensile strength of 87.0 MPa or greater, wherein the formed polyimide product does not comprise an encapsulated filler, and wherein the polyimide comprises a first repeat unit derived from pyromellitic dianhydride (PMDA) and a second repeat unit derived from 4,4'-oxodianiline (4,4'-ODA). Embodiments in which the hot isostatically pressed polyimide product, ram extruded (that may optionally be subsequently hot isostatically pressed) polyimide product, or hot compression moulded polyimide product does not comprise an encapsulated filler may comprise an additive, for example 0.5 wt % or less PTFE relative to the weight of the polyimide. Such additives may aid mould release during the moulding activities with the resin.

The formed polyimide product of the present invention may be a hot isostatically pressed crystalline polyimide product, a ram extruded (that may optionally be subsequently hot isostatically pressed) crystalline polyimide product, or a hot compression moulded crystalline polyimide product, said formed polyimide product having a tensile strength of 66.0 MPa or greater, wherein said formed polyimide product comprises an encapsulated filler (e.g. 15 wt %±1.0 wt % graphite relative to the weight of the polyimide), and wherein the polyimide comprises a first repeat unit derived from pyromellitic dianhydride (PMDA) and a second repeat unit derived from 4,4'-oxodianiline (4,4'-ODA). Embodiments in which the hot isostatically pressed crystalline polyimide product, ram extruded (that may optionally be subsequently hot isostatically pressed) crystalline polyimide product, or hot compression moulded crystalline polyimide product comprises an encapsulated filler (e.g. 15 wt %±1.0 wt % graphite relative to the weight of the polyimide) may comprise an additive, for example 0.5 wt % or less PTFE relative to the weight of the polyimide. Such additives may aid mould release during the moulding activities with the resin.

The formed polyimide product of the present invention may be a hot isostatically pressed crystalline polyimide product, a ram extruded (that may optionally be subsequently hot isostatically pressed) crystalline polyimide product, or a hot compression moulded crystalline polyimide product, said formed polyimide product having a tensile strength of 52.5 MPa or greater, wherein said formed polyimide product comprises an encapsulated filler (e.g. 40 wt %±5.0 wt % graphite relative to the weight of the polyimide), and wherein the polyimide comprises a first repeat unit derived from pyromellitic dianhydride (PMDA) and a second repeat unit derived from 4,4'-oxodianiline (4,4'-ODA). Embodiments in which the hot isostatically pressed crystalline polyimide product, ram extruded (that may optionally be subsequently hot isostatically pressed) crystalline polyimide product, or hot compression moulded crystalline polyimide product comprises an encapsulated filler (e.g. 40 wt % 5.0 wt % graphite relative to the weight of the polyimide) may comprise an additive, for example 2.0 wt % or less PTFE relative to the weight of the polyimide. Such additives may aid mould release during the moulding activities with the resin.

The formed polyimide product of the present invention may be a hot isostatically pressed crystalline polyimide product, a ram extruded (that may optionally be subsequently hot isostatically pressed) crystalline polyimide product, or a hot compression moulded crystalline polyimide product, said formed polyimide product having a tensile strength of 49.5 MPa or greater, wherein said formed polyimide product comprises an encapsulated filler (e.g. 15 wt %±3.0 wt % graphite relative to the weight of the polyimide) and an additive (e.g. 10 wt %±1.5 wt % PTFE relative to the weight of the polyimide), and wherein the polyimide comprises a first repeat unit derived from pyromellitic dianhydride (PMDA) and a second repeat unit derived from 4,4'-oxodianiline (4,4'-ODA).

The formed polyimide product of the present invention may be a hot isostatically pressed crystalline polyimide product, a ram extruded (that may optionally be subsequently hot isostatically pressed) crystalline polyimide product, or a hot compression moulded crystalline polyimide product, said formed polyimide product having a tensile strength of 59.0 MPa or greater, wherein said formed polyimide product does not comprise an encapsulated filler and comprises an additive (e.g. 15 wt %±1.5 wt % molybdenum disulphide relative to the weight of the polyimide), and wherein the polyimide comprises a first repeat unit derived from pyromellitic dianhydride (PMDA) and a second repeat unit derived from 4,4'-oxodianiline (4,4'-ODA).

The formed polyimide product of the present invention may be a hot isostatically pressed crystalline polyimide product, a ram extruded (that may optionally be subsequently hot isostatically pressed) crystalline polyimide product, or a hot compression moulded crystalline polyimide product, said formed polyimide product having a tensile strength of 39.5 MPa or greater, wherein said formed polyimide product comprises an encapsulated filler (e.g. 40 wt %±5.0 wt % graphite relative to the weight of the polyimide) and an additive (e.g. 15 wt %±1.0 wt % PTFE relative to the weight of the polyimide), and wherein the polyimide comprises a first repeat unit derived from pyromellitic dianhydride (PMDA) and a second repeat unit derived from 4,4'-oxodianiline (4,4'-ODA).

The tensile strength of a formed polyimide product, as used herein, is as determined by ASTM D1708 based on a 2.5 mm thick test specimen with a test speed of 1 mm per minute. Unless otherwise specified, tensile strengths are as measured at 23° C.

The formed polyimide product of the present invention comprises a polyimide which comprise a first repeat unit derived from pyromellitic dianhydride (PMDA) and a second repeat unit derived from 4,4'-oxodianiline (4,4'-ODA). The composition of the polyimide comprised in the formed polyimide product of the present invention is typically as described above with reference to the polyimide to be treated and/or treated polyimide of the methods of the present invention.

The formed polyimide product of the present invention may comprise an encapsulated filler. In embodiments where the formed polyimide product comprises an encapsulated filler, the encapsulated filler is typically graphite. Particles of the encapsulated filler comprised in the formed polyimide product typically have a Dv90 of 2.0 to 10.0 μm, preferably 3 to 9 μm, more preferably 4.0 to 8.0 μm, and most preferably 5.0 to 7.0 μm. The amount of encapsulated filler present in the formed polyimide product is typically 5 to 60 wt %, such as 10 to 20 wt % or 35 to 45 wt %, preferably 12 to 18 wt % or 37 to 43 wt %, more preferably 14 to 16 wt % or 39 t 41 wt % and most preferably about 15 wt % or about 40 wt %, relative to the weight of the formed polyimide product.

The formed polyimide product of the present invention may comprise an additive. Suitable additives include moulding additives and lubricants, such as PTFE and MoS$_2$. For example, the formed polyimide product may comprise PTFE in an amount of from 0.1 wt % to 15 wt % relative to the weight of the formed polyimide product. PTFE is typically present as a moulding additive and/or a lubricant. In another example, MoS$_2$ may be mixed with the treated polyimide powder in an amount of typically from 0.1 wt % to 15 wt % relative to the weight of the formed polyimide product. MoS$_2$ is typically present as a lubricant.

The direct formed polyimide product of the present invention may have a tensile strength of 80.0 MPa or more and a specific gravity of 1.40 or less. Typically, in such embodiments, the formed polyimide product does not comprise a filler (e.g. does not comprise graphite).

The direct formed polyimide product of the present invention may have a tensile strength of 70.0 MPa or more and a specific gravity of 1.50 or less. Typically, in such embodiments, the formed polyimide product does comprise a filler as described above (e.g. comprises 15 wt %±1.0 wt % graphite relative to the weight of the polyimide).

The direct formed polyimide product of the present invention may have a tensile strength of 40.0 MPa or more at 260° C., e.g. 41.0 MPa or more at 260° C., 42.0 MPa or more at 260° C., or 43.0 MPa or more at 260° C., 44.0 MPa or more at 260° C., or 45.0 MPa or more at 260° C.

The direct formed polyimide product of the present invention may have a tensile strength of 40.0 MPa or more at 260° C. and a specific gravity of 1.40 or less. Typically, in such embodiments, the formed polyimide product does not comprise a filler (e.g. does not comprise graphite).

The direct formed polyimide product of the present invention may have a tensile strength of 40.0 MPa or more at 260° C. and a specific gravity of 1.50 or less. Typically, in such embodiments, the formed polyimide product does comprise a filler as described above (e.g. comprises 15 wt %±1.0 wt % graphite relative to the weight of the polyimide).

The formed polyimide product of the present invention may have a tensile strength of 110.0 MPa or less, e.g. 105.0 MPa or less, 100.0 MPa or less, 95.0 MPa or less, 90.0 MPa or less, 85.0 MPa or less, 80.0 MPa or less, 75.0 MPa or less, or 70.0 MPa or less.

The presence of an encapsulated filler within the polyimide resin and/or the presence of an additive typically reduces the tensile strength of the polyimide compared to a polyimide which does not comprise an encapsulated filler and/or additive. However the tensile strength of a polyimide according to the present invention which comprises an encapsulated filler and/or additive will typically be greater than was achievable for the same amount of encapsulated and/or blended filer and/or additive in crystalline polyimide products prior to the present invention.

As used herein, the specific gravity of a formed polyimide product is typically relative to deionised water and may be determined by methods known to a skilled person, for example by ASTM D792-20 or by determining the volume of a test body at a specified temperature, typically 20.0° C., (e.g. by measuring the length and diameter of a cylindrical test body with Vernier calipers and calculating the volume of the test body based on the measured length and diameter), measuring the mass of the test body (e.g. on digital scales accurate to within 0.001 g), calculating the density of the test body based on the calculated volume and the measured mass, and expressing the density relative to a literature value for the density of deionised water at the specified temperature (e.g. 0.9982 g cm$^{-3}$ at 20.0° C.).

As used herein, the crystallinity of the formed polyimide product of the present invention is typically as described above with reference to the polyimide of the present invention.

The formed polyimide product of the present invention may be any type of product. Examples include handling machinery parts (e.g. semiconductor handling machinery parts, glass handling machinery parts), chip test sockets, wafer clamping rings, valve seats, products for sealing applications, spline couplings, bearings (e.g. ball bearings), bushings, locking fasteners (e.g. for aerospace), pivot bushings (e.g. for unison ring), and thrust washers.

The present invention also provides an article comprising a formed polyimide product of the present invention. The nature of the article is not particularly limited and will depend on the application of the formed polyimide product. For example, if the formed polyimide product is a semiconductor handling machinery part, the article may be a semiconductor handling machine.

EXAMPLES

Example 1

Polyimide powder was produced substantially according to the procedure taught in Example III of U.S. Pat. No. 3,249,588. The production procedure was terminated before the vacuum drying step reported in Example III of U.S. Pat. No. 3,249,588.

The polyimide powder thus obtained was in the form of a wet filter cake and was contacted with supercritical $CO_2$ in a 25 L supercritical fluid extractor at 80° C. and 150 bar. 8 kg of $CO_2$ was used in the extraction per kg of polyimide filter cake. A treated polyimide powder was obtained.

Example 2

A treated polyimide powder was obtained according to the same procedure as Example 1, except that graphite was present in the polyamic-acid solution before conversion to the polyimide. The graphite used was synthetic graphite with a D90 (laser diffraction) of 5.5-6.8 μm. The amount of graphite added was 15 wt %, relative to the weight of the polyimide subsequently obtained.

Comparative Example 1

A polyimide powder was obtained according to the same procedure as Example 1, and vacuum dried, without the step of contacting the polyimide powder with supercritical CO2.

Comparative Example 2

A polyimide powder was obtained according to the same procedure as Example 2, and vacuum dried, without the step of contacting the polyimide powder with supercritical CO2.
Evaluation The BET specific surface area of the polyimide powders obtained in Examples 1 and 2 and Comparative Examples 1 and 2 was measured according to ISO 9211:2010 using multi-point determination with $N_2$ Technical X47S as the adsorptive with a purity of 99.999%, impurities present as $H_2O$<3 ppm, impurities present as $O_2$<5 ppm 2.5 mm thick test specimens were prepared from the polyimide powders obtained in Examples 1 and 2 and Comparative Examples 1 and 2 by heating the polyimide powder to 200° C. and then direct forming in an unheated press tool at 100,000 psi and subsequently firing at 400° C. The tensile strength was measured at 23° C. according to ASTM D1708 with a test speed of 1 mm/min.

Crystallinity index was measured by DSC.

Results are provided in Table 1 below.

TABLE 1

| Example No | Tensile Strength of direct formed test specimen (MPa) | BET specific surface area of polyimide powder (m²/g) | Specific gravity | Crystallinity Index |
|---|---|---|---|---|
| Example 1 | 82.17 | 153.87 | 1.39 | 30 |
| Comparative Example 1 | 69.43 | 68.88 | 1.36 | 30 |
| Example 2 | 71.33 | 115.69 | 1.46 | 30 |
| Comparative Example 2 | 63.28 | 56.68 | 1.43 | 30 |

Examples 1 and 2 were also tested to determine tensile strength properties at elevated temperature (260° C.) and the results compared to literature values for Vespel SP1 (unfilled) and Vespel SP21 (15% graphite filled) products.

Tensile strength testing was as described above apart from the elevated temperature. Results are shown in Table 2 below.

TABLE 2

| Example No | Tensile Strength of direct formed test specimen (MPa) | Specific gravity |
|---|---|---|
| Example 1 (DF) | 43.5 | 1.39 |
| Vespel SP1 (DF) | 36.5 | 1.36 |
| Vespel SP1 (S) | 41.4 | 1.43 |
| Example 2 (DF) | 41.2 | 1.46 |
| Vespel SP21 (DF) | 30.3 | 1.43 |
| Vespel SP21 (S) | 37.9 | 1.51 |

DF = direct formed
S = hot isostatically pressed

The results above show that the polyimide powder according to the invention has a higher BET surface area than a corresponding polyimide powder obtained without the supercritical/low surface tension wash step, and improved tensile strength at ambient and elevated temperatures.

The invention has been described with reference to various non-limiting embodiments and examples. A skilled person will appreciate that various modifications can be made to the embodiments and examples without departing from the scope of protection conferred by the present patent, which shall be determined by the claims, with due account taken of any element which is equivalent to an element specified in the claims.

All documents mentioned herein (including patent documents and non-patent documents) are hereby incorporated by reference in their entirety.

The invention claimed is:

1. A method of treating a polyimide, comprising:
   providing a polyimide to be treated; and
   contacting the polyimide to be treated with a fluid to obtain a treated polyimide;
   wherein the polyimide comprises a first repeat unit derived from pyromellitic dianhydride (PMDA) and a second repeat unit derived from 4,4'-oxodianiline (4,4'-ODA);
   wherein the fluid comprises a supercritical fluid, a liquid with a surface tension of 10.0 mN m$^{-1}$ or less under the conditions of the contacting step, or a mixture thereof;
   wherein the polyimide to be treated is a plurality of particles;
   and wherein the plurality of polyimide particles has a particle size characterised by a volume median diameter (Dv50) of 10 to 80 μm as measured by laser diffraction in deionised water in accordance with ISO 13320:2009.

2. The method of claim 1, wherein the fluid comprises a supercritical fluid.

3. The method of claim 1, wherein the fluid comprises a liquid with a surface tension of 8.5 mN m$^{-1}$ or less under the conditions of the contacting step.

4. The method of claim 3, wherein the fluid comprises a liquid with a surface tension of 4.5 mN m$^{-1}$ or less under the conditions of the contacting step.

5. The method of claim 1, wherein the fluid comprises methane, ethane, ethylene, carbon dioxide, nitrous oxide, or a mixture thereof.

6. The method of claim 1, wherein the polyimide to be treated is poly(PMDA-co-4,4'-ODA).

7. The method of claim 1, wherein the fluid comprises supercritical carbon dioxide and/or liquid carbon dioxide with a surface tension of 2.0 mN m$^{-1}$ or less.

8. The method of claim 1, wherein an encapsulated filler is present within the polyimide to be treated.

9. The method of claim 8, wherein the encapsulated filler is graphite.

10. The method of claim 1, wherein the treated polyimide does not comprise an encapsulated filler or comprises an encapsulated filler in an amount of 20 wt % or less relative to the weight of the polyimide, and wherein the treated polyimide has a BET specific surface area greater than 100 m$^2$ g$^{-1}$;
   wherein the BET specific surface area is determined according to ISO 9211:2010.

11. The method of claim 1, wherein the treated polyimide comprises an encapsulated filler in an amount of 20 wt % to 60 wt % relative to the weight of the polyimide, and wherein the treated polyimide has a BET specific surface area greater than 70 m$^2$ g$^{-1}$;
   wherein the BET specific surface area is determined according to ISO 9211:2010.

12. The method of claim 1, further comprising a step of mixing the treated polyimide with an additive to obtain a polyimide mixture.

13. The method of claim 12, further comprising forming the polyimide mixture to obtain a formed polyimide product.

14. The method of claim 1, further comprising forming the treated polyimide to obtain a formed polyimide product.

15. The method of claim 14, wherein the forming is carried out by direct forming to obtain a direct formed polyimide product, or wherein the forming is carried out by hot compression moulding to obtain a hot compression moulded polyimide product, or wherein the forming is carried out by hot isostatic pressing to obtain a hot isostatically pressed polyimide product, or wherein the forming is carried out by ram extrusion to obtain a ram extruded polyimide product.

16. The method of claim 15, wherein the polyimide product is a direct formed polyimide product and does not comprise an encapsulated filler and has a tensile strength of 80.0 MPa or more and a specific gravity of 1.40 or less;
   wherein the specific gravity of the direct formed polyimide product is relative to deionised water and is determined by ASTM D792-20;
   and wherein the tensile strength is determined by ASTM D1708.

17. The method of claim 15, wherein the polyimide product is a direct formed polyimide product, comprises 10 to 20 wt % of an encapsulated filler and has a tensile strength of 70.0 MPa or more and a specific gravity of 1.50 or less;
   wherein the specific gravity of the direct formed polyimide product is relative to deionised water and is determined by ASTM D792-20;
   and wherein the tensile strength is determined by ASTM D1708.

18. The method of claim 15, wherein the polyimide product is a hot compression moulded polyimide product, a hot isostatically pressed polyimide product, or a ram extruded polyimide product, does not comprise an encapsulated filler, and has a tensile strength of 90.0 MPa or more;
   wherein the tensile strength is determined by ASTM D1708.

19. The method of claim 15, wherein the polyimide product is a hot compression moulded polyimide product, a hot isostatically pressed polyimide product, or a ram extruded polyimide product, comprises 10 to 20 wt % of an encapsulated filler and has a tensile strength of 70.0 MPa or more, wherein the tensile strength is determined by ASTM D1708.

* * * * *